May 25, 1937.  R. A. GOELLER  2,081,197
FLOOR CONDUIT
Filed Feb. 17, 1933  2 Sheets-Sheet 1
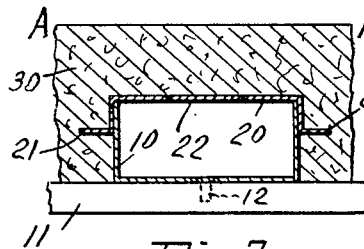
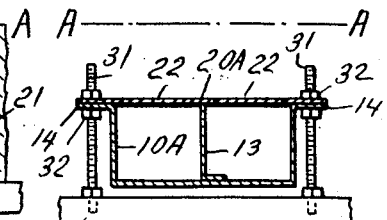
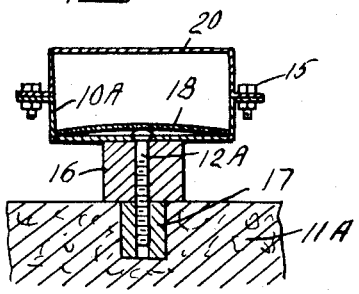
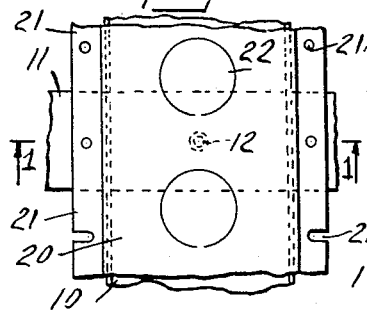
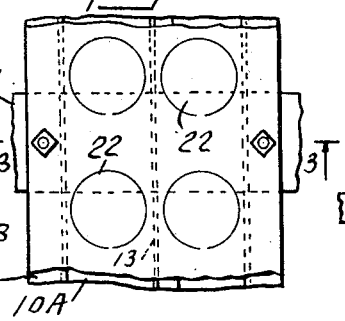
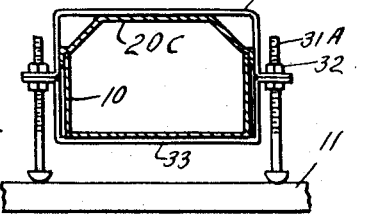
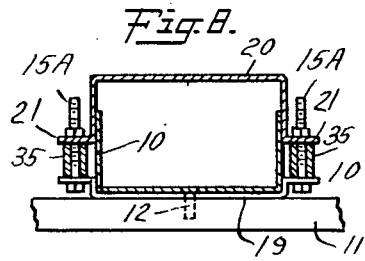
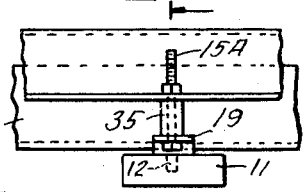
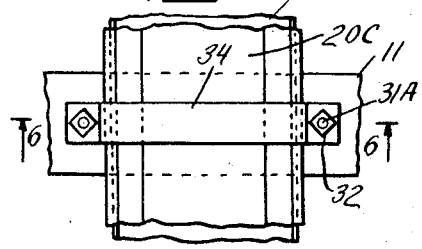
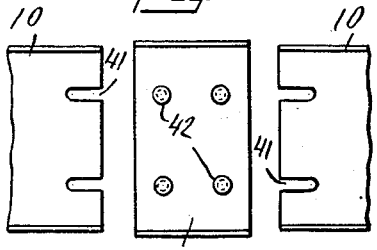
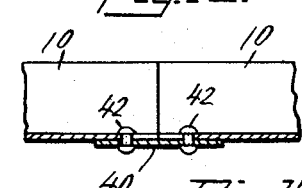
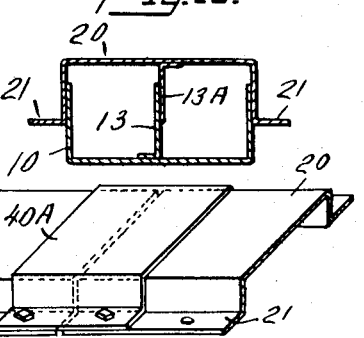
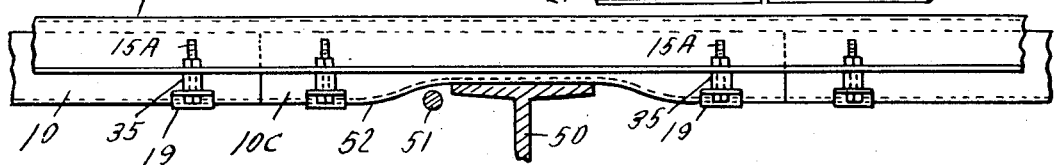
INVENTOR
Robert A. Goeller
BY
Marshall O Hawley
ATTORNEYS

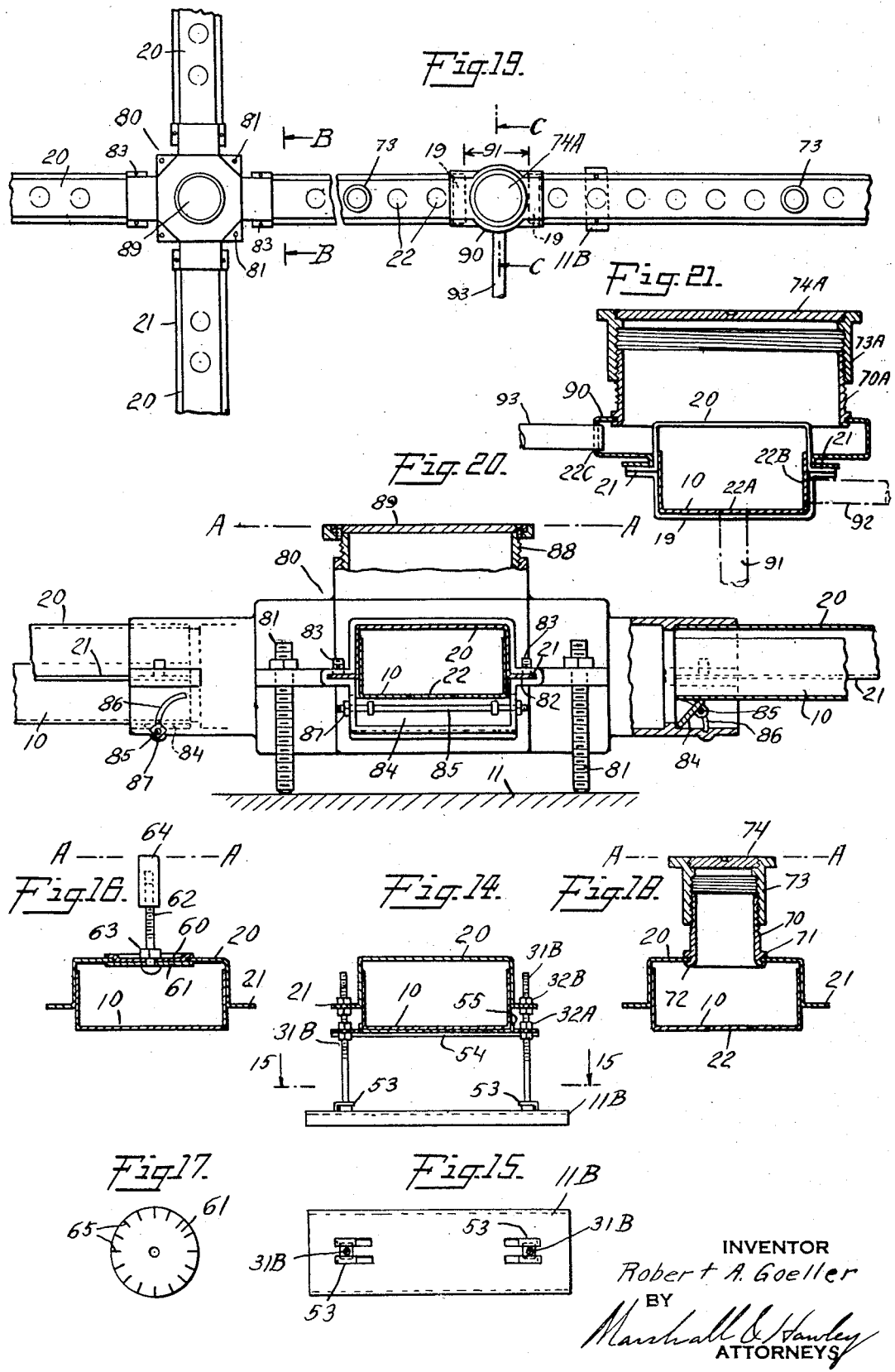

Patented May 25, 1937

2,081,197

UNITED STATES PATENT OFFICE 2,081,197

FLOOR CONDUIT

Robert A. Goeller, Larchmont, N. Y.

Application February 17, 1933, Serial No. 657,206

10 Claims. (Cl. 247—3)

This invention relates to improvements in floor conduits, and its object is to provide a simple and inexpensive device which may be embedded in a floor structure with its upper surface under the floor level. Primarily, this conduit is made of two interfitting members which gives it many advantages which will be set forth.

A further object is to provide a construction of parts which may be easily assembled and installed.

Still further objects are to provide a conduit constructed of parts which may be relatively adjusted to vary the size of the duct, to provide simple arrangements for adjusting the position of the conduit or of its parts to meet different floor conditions, to provide for ready access to the conduit and in general to overcome objectionable features in structures of this type which have been available heretofore.

These and other objects of the invention will appear from the following specification in which I will describe the invention, the novel features of which will be pointed out in appended claims.

Referring to the drawings,

Fig. 1 is a sectional end elevation of a simple form of conduit which embodies this invention, the section being taken on the line 1—1 of Fig. 2;

Fig. 2 is a plan view of the structure shown in Fig. 1;

Fig. 3 is a sectional end elevation of another structure which also embodies the invention, the section being taken on the line 3—3 of Fig. 4;

Fig. 4 is a plan view of the parts shown in Fig. 3;

Fig. 5 is a sectional end elevation of a modified construction;

Fig. 6 is a sectional end elevation of another construction, the section being taken on the line 6—6 of Fig. 7;

Fig. 7 is a plan view of the construction shown in Fig. 6;

Fig. 8 is a sectional end view of a further modification, the section being taken on the line 8—8 of Fig. 9;

Fig. 9 is a side elevation of the modification shown in Fig. 8;

Fig. 10 is a sectional end elevation of a modification of the construction shown in Fig. 8;

Fig. 11 is a plan view of adjacent ends of two of the lower sections of the conduit; together with a connecting piece, the parts being shown separated;

Fig. 12 is a sectional side elevation of the elements shown in Fig. 11 with the parts fastened together;

Fig. 12A is a perspective view of a connection for the upper sections;

Fig. 13 is a side elevation of a conduit embodying this invention crossing parts such as those which are met in building constructions, the latter parts being shown in section;

Fig. 14 is a sectional end elevation showing another way of supporting and adjusting the conduit;

Fig. 15 is a sectional plan view taken on the line 15—15 of Fig. 14;

Fig. 16 is a sectional end elevation of one of these novel conduits, fitted with a removable closure and an indicator therefor;

Fig. 17 is a plan view of one of the parts shown in Fig. 16;

Fig. 18 is a sectional view similar to Fig. 16 showing an outlet affixed to the upper section of the conduit in place of the removable closure shown in the latter figure;

Fig. 19 is a plan view of an assembly of several of these conduits associated with a junction box which has been especially designed for them;

Fig. 20 is an enlarged elevation, partly in section, of the parts shown in Fig. 19, the section being taken on the line B—B of the latter figure; and Fig. 21 is a similar sectional elevation taken on the line C—C of Fig. 19 showing a supplementary junction box.

Referring first to Figs. 1 and 2, 10 designates the lower section of a two piece conduit. This is shown as resting upon a structural member 11 and affixed thereto by a screw 12. Access to such a screw is one of the advantages of my two piece construction. 20 is the upper section of the conduit. Its downwardly extending sides fit over the upstanding sides of the lower section 10 and terminate in side flanges 21 having holes 21A punched through them, or notched, as shown at 21B. 22 designates a plurality of knockouts in the upper surface of the upper section.

No vertical adjustment is shown in this simple form of the invention. The conduit is shown as having a sufficient height to bring the upper surfaces of member 20 below the floor level which is indicated by the line A—A. 30 designates the material of the floor, such as cement. When this is laid around the conduit the flanges 21 become embedded in it and thus permanently secured in place. Access to the conduit may be obtained by drilling through the floor above the desired knockout and removing the latter. These are close together so that such access may be had wherever desired. Obviously, knockouts may be provided in the lower section, if desired.

In Figs. 3 and 4 the lower section 10A is provided with a partition plate 13 and with side flanges 14. In this case the upper section 20A is a flat plate of sufficient width to cover the flanges 14 and is provided with two rows of knockouts 22 whereby access may be had to the conduit at either or both sides of the plate 13.

The sections 10A and 20A are secured together by bolts 31 and nuts 32 by which the elevation of the conduit may be adjusted. The bolts 31 are shown as screwed into the structural member 11. By the use of the partition plate a single conduit forms a plurality of ducts which may be used for unlike service, as for example, carrying light and power conductors in one and telephone and bell wires in another.

Fig. 5 shows another construction in which both the lower section 10A and the upper section 20 are provided with side flanges connected by bolts and nuts 15. This figure also shows a convenient way of fixing the elevation of the conduit. A long screw 12A passes through the lower section and a spacing block 16 into an anchorage member 17 in the structure 11A. 18 is a sheet of insulation over the head of the screw.

The conduit shown in Fig. 6 comprises two interfitted sections 10 and 20C held together by a band which comprises two flanged members 33 and 34 held together by bolts 31A and 32 by which the elevation of the conduit above the structural member 11 may be adjusted. In this case the heads of the bolts 31A are shown resting upon the member 11.

An important advantage of a two piece conduit is that the size of the duct which it forms may be changed by a relative vertical adjustment of its two sections. In Figs. 8 and 9 the lower section 10 rests upon a flanged saddle 19, both of which are fixed to the member 11 by a screw 12. Spacers 35 are interposed between the flanges which are secured together by bolts which pass through the holes 21A or notches 21B in the flanges 21 and nuts 15A. An advantage of the side flanges is that supporting clamps may be affixed to them at any desired points.

With this adjustable form of conduit partition plates 13 and 13A may be used, as shown in Fig. 10.

Because of the accessibility of the lower section before it is closed by the upper section, it is possible to make an effective joint between adjacent sections. In Fig. 11 the ends of two lower sections 10, 10 are shown with a connecting piece 40 between them. The ends of the lower webs of the lower sections are slotted, as at 41, to receive bolts or rivets 42 on the connecting piece. When these parts are joined, as shown in Fig. 12, they are united both mechanically and electrically, thus forming an effective grounding means. These joints may be overlapped by continuous portions of the upper sections and the latter may be similarly connected before they are placed upon the lower sections.

Another way of joining the upper sections is shown in Fig. 12A in which a flanged saddle connector 40A overlaps the adjacent ends of two upper sections and its flange is affixed to the flanges of the upper sections.

Obstructions are often met in the building construction, such as a girder, shown at 50 in Fig. 13, or a tie-rod or cable, as indicated at 51. In such a case a lower section, such as 10C, is provided which is formed, as at 52, to pass such obstructions. Because of the two piece construction the upper sections may be in a continuous straight line.

A way of adjusting the elevation of the lower section as well as that of the upper section relative to that of the lower section is shown in Figs. 14 and 15. In this case a structural member 11B has portions 53 struck up to receive the head of bolts 31B. These bolts pass through a cross bar 54 upon which the lower section 10 rests. The cross bars have lugs 55 to center the lower section. They are secured in the desired elevation by nuts 32A on bolts 31B. The upper section 20 is secured in the desired elevation by nuts 32B on bolts 31B.

Instead of providing the knockouts 22 in the upper section, I sometimes use the construction illustrated in Figs. 16, 17, and 18 to provide access to the conduit. Holes are provided at intervals in the upper section or some of the knockouts are removed and the holes are closed by plates 60 and discs 61 secured together between the head of a bolt 62 and a nut 63. 64 is an indicator screwed onto bolt 62 which may be rotated thereon to bring it to the floor level. When it is desired to make an outlet at one of the spots shown by an indicator 64, the latter is removed and a hole made in the floor with a hollow drill. Then after loosening nuts 63 and plate 60, the disc 61 may be removed. The latter is of flexible material and its edges may be cut, as shown at 65 in Fig. 17, to increase its flexibility.

After this a tube 70 having a flange 71 is inserted in a hole in the upper section 20 and its lower end bent outwardly, as at 72. The tube 70 is threaded to receive cylindrical extension member 73. The latter is rotated on tube 70 until its upper end which preferably is flanged is at the floor level. 74 is a closure cap for the extension member 73. One of the advantages of this two piece construction is that such outlets may be affixed in any desired manner to a section before it is put in place, thereby forming pre-set outlets, as shown at 73 in Fig. 19.

In Figs. 19 and 20, 80 designates a junction box for joining conduits which meet at angles. This is supported by screws 81 which rest upon a structural member 11 and by means of which the elevation of the junction box may be adjusted to correspond to that of the upper sections of the conduits. On the sides of the junction box are openings into which the ends of the upper sections 20 fit and slots 82 which receive their flanges 21. 83 are set screws for engaging these flanges. The openings in the sides of the junction box are deep enough to allow for the vertical adjustment between the two sections of the conduit and a plate 84 is provided to fill the space below the lower section to prevent concrete or cement from flowing into the junction box. The bottom of the lower sections rests on these plates 84 and their vertical position in relation to the upper sections 20 is adjusted by the positions of these plates. This plate 84 is adjusted by a rod 85 which passes through an arcuate slot 86 and which is secured in position by nuts 87. 88 is a tubular extension member screwed into the junction box. Its height may be adjusted to the floor level. 89 is a closing plate for the extension member.

90 is a supplementary junction box which is shown in Figs. 19 and 21. These may be placed at desired intervals between the main junction boxes after the lower sections have been laid, but leaving a space 91 between the ends of adjacent upper sections and closing it by an overlapping box 90. The latter rests upon and is secured to the flanges 21 of the adjacent upper sections. It is widened to receive and support a tube 70A on which is threaded a cylindrical extension member 73A, the upper end of which is closed by a cap 74A. The member 70A and cap 74A are of sufficient diameter to provide a hand hole for access to the interior of the duct, from which conduits may be led. In this figure a knockout 22A is shown in the bottom of the lower section 10 from which a conduit 91, shown in dotted lines, may be led to an outlet in the ceiling below it or to a side wall fixture. A knockout 22B is shown in the side of the lower section from which a conduit 92 may be led off laterally. A removable outlet 22C may be provided in the side of the box 90 from which a conduit 93 is led.

Conductors may be laid in the conduit while it is open, that is, before the upper section is put in place. Some of the other advantages of this invention have been mentioned. Several constructions have been illustrated and described to show that this invention is not limited to any specific form, and I intend no limitations other than those imposed by the appended claims.

What I claim is:

1. A conduit comprising a lower section having upstanding sides forming a trough-like member and an upper section having depending sides overlapping said sides of the lower member, with side flanges extending outwardly from the lower edges thereof, by which said upper section may be held in place, spaced removable closures in the upper surface of said upper member, and means for adjusting the relative vertical position of the sections.

2. A conduit comprising a lower section having upstanding sides forming a trough-like member and an upstanding partition member between said sides and an upper section having depending sides overlapping said sides of the lower member, a depending partition member overlapping the partition member of the lower section, with side flanges extending outwardly from the lower edges thereof, by which said upper section may be held in place, spaced removable closures in the upper surface of said upper member, and means for adjusting the relative vertical position of the sections.

3. A conduit comprising a lower section having upstanding sides, an upper section having sides overlapping the sides of the lower section, and means for adjusting the relative vertical position of the sections.

4. A conduit comprising a lower section having upstanding sides, means for adjusting the elevation of said lower section, an upper section having sides overlapping the sides of the lower section, and means for adjusting the relative vertical position of the sections.

5. A conduit comprising a lower section having upstanding sides forming a trough-like member, an upper section having depending sides overlapping said sides of the lower member with their edges bent outwardly to form laterally extending side flanges extending outwardly from the lower edges thereof, combined with a junction box constructed with slots for receiving said side flanges, to support the upper section and an adjustable closure below and between said slots engaging the lower section by means of which the relative vertical position of said sections may be adjusted.

6. A conduit comprising a lower section having upstanding sides, an upper section having sides overlapping the sides of the lower section, means for adjusting the relative vertical position of the sections, and a vertically adjustable outlet affixed to said upper section.

7. A conduit comprising a lower section having upstanding sides, an upper section having sides overlapping the sides of the lower section, means for adjusting the relative vertical position of the sections, a removable closure in the upper section, and a vertically adjustable gauge affixed to said closure.

8. A conduit comprising a lower section having upstanding sides forming a trough-like member and an upper section having depending sides overlapping said sides of the lower section, with side flanges extending outwardly from the lower edges thereof, by which said upper section may be supported, means for adjusting the relative vertical position of the sections, and an outlet device adapted to be placed over a continuous portion of a lower section between separated adjacent parts of the upper section supported by the outlet device.

9. A conduit comprising a lower section having upstanding sides forming a trough-like member and an upper section having depending sides overlapping said sides of the lower section, with side flanges extending outwardly from the lower edges thereof, by which said upper section may be supported, means for adjusting the relative vertical position of the sections, and an outlet device adapted to be placed over a continuous portion of a lower section between separated adjacent parts of the upper section, said outlet device being constructed with slots to engage the side flanges of the upper section to support said parts of the upper section.

10. A conduit comprising a lower section having upstanding sides forming a trough-like member and an upper section having depending sides overlapping said sides of the lower section, with side flanges extending outwardly from the lower edges thereof, by which said upper section may be supported, means for adjusting the relative vertical position of the sections, an outlet device adapted to be placed over a continuous portion of a lower section between separated adjacent parts of the upper section, said outlet device being constructed with slots to engage the side flanges of the upper section to support said parts of the upper section, and a vertically adjustable member on said outlet device.

ROBERT A. GOELLER.